Dec. 8, 1931.   O. F. CARLSON   1,835,592
HITCH CONNECTION
Filed March 9, 1929   2 Sheets-Sheet 1
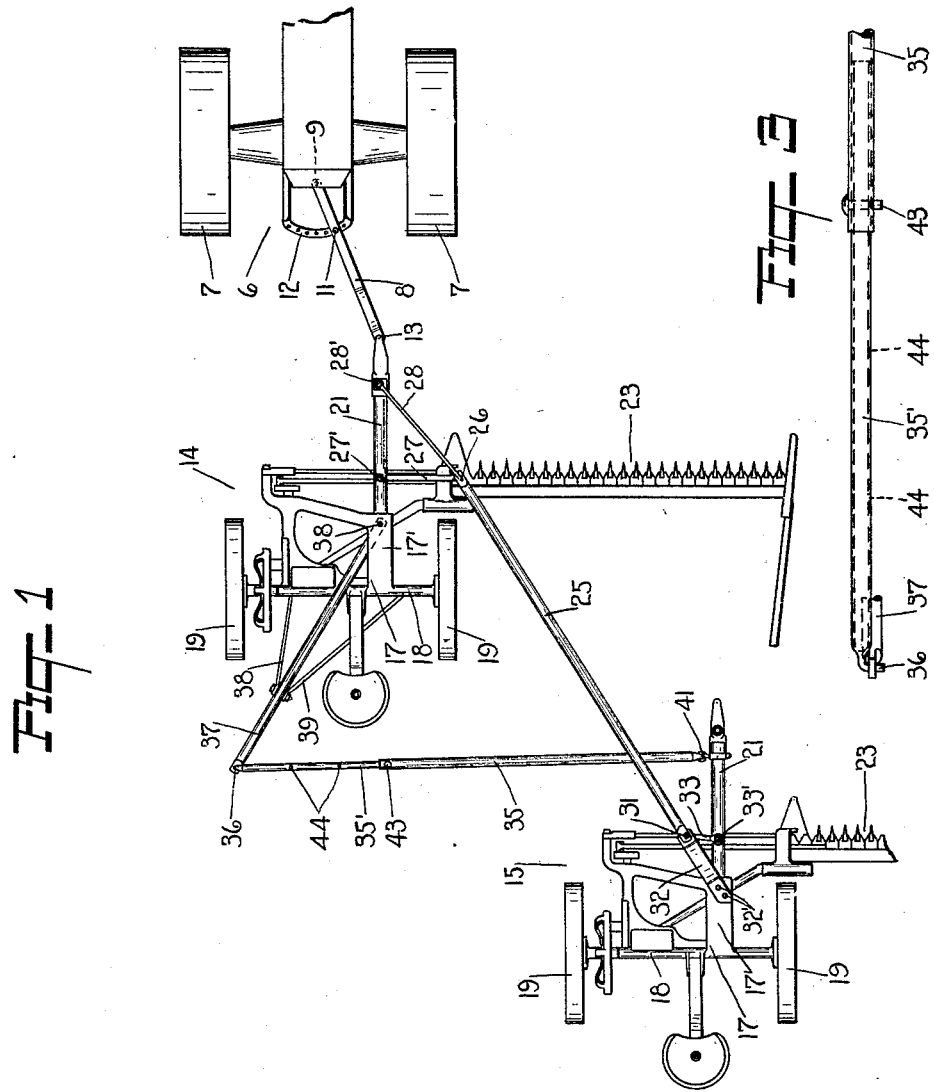
Inventor
Oscar F. Carlson
Brown Jackson,
Boettcher & Dienner
Attorneys Dec. 8, 1931.   O. F. CARLSON   1,835,592
HITCH CONNECTION
Filed March 9, 1929   2 Sheets-Sheet 2
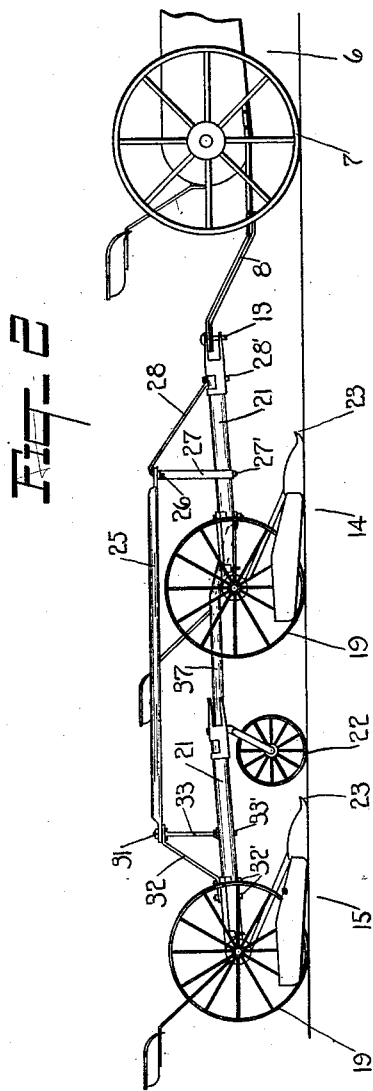
Inventor
Oscar F. Carlson
Brown, Jackson,
Boettcher & Drenner
By Attorneys Patented Dec. 8, 1931

1,835,592

UNITED STATES PATENT OFFICE

OSCAR F. CARLSON, OF MOLINE, ILLINOIS, ASSIGNOR TO DEERE & COMPANY, OF MOLINE, ILLINOIS, A CORPORATION OF ILLINOIS

HITCH CONNECTION

Application filed March 9, 1929. Serial No. 345,643.

The present invention relates to hitch connections such as are employed for connecting two farm implements or the like in tandem staggered relation. The utility of this type of hitch connection is best illustrated in instances where it is desired to pull two mowing machines in tandem staggered relation behind a tractor for cutting a wide swath in the field, but it will be understood that the utility of the present hitch connection is not necessarily limited to this particular use, but is also adaptable to use with other implements or vehicles for pulling the same in similar relation.

The principal object of the invention is to provide a hitch connection of the above general description which will positively maintain accurate steering guidance of the rear implement either when turning to the right or to the left, at any angle, or when traveling straight ahead.

This accurate steering guidance is of decided importance when pulling mowers, because in such instances the inner end of the sickle bar of the rear mower is usually disposed directly back of the outer end of the sickle bar of the front mower in order to obtain the maximum cutting span of the two mowers, and such relation must be maintained with comparatively close accuracy when turning in either direction or when travelling straight ahead so as to prevent portions of the crop being missed between the two sickle bars.

A further object of the invention is to provide a hitch connection of this type which can be readily adjusted to accommodate implements of different sizes, and different operating conditions.

A further object is to provide such a hitch connection which is simple, sturdy and inexpensive, and which can be quickly and easily connected to, and disconnected from, the implements, without necessitating any material change in the design or construction of the implements.

Referring to the accompanying drawings wherein I have illustrated a preferred embodiment of my invention:—

Fig. 1 is a fragmentary plan view illustrating the adaptation of my invention to two mowers being pulled in rear of a tractor;

Fig. 2 is a fragmentary side elevational view illustrating the same; and

Fig. 3 is a fragmentary view on a larger scale illustrating the manner of adjusting the transverse link or steering rod of the apparatus.

Referring to Fig. 1, the rear portion of a tractor or other pulling vehicle is indicated at 6, the same comprising the two rear traction wheels 7 and the draw bar 8. Such draw bar is shown as being pivoted to the tractor at 9, and is capable of being held at different draft angles by a pin 11 passing through said bar and engaging selectively in spaced holes in an arcuate supporting bar 12 at the rear of the tractor. Connected to the tractor in draft relation are two mowers 14 and 15, the front mower being coupled to the tractor draft bar 8 at the hitch point 13, and the rear mower 15 being connected to the front mower 14 through the present hitch connection.

The two mowers may be of any conventional construction, each shown as comprising a main frame 17 having a transversely extending axle 18 on the outer ends of which are mounted the two supporting wheels 19 of the implement. A draft tongue 21 extends forwardly from the longitudinally extending portion 17' of the frame 17. As shown in Fig. 2, the front end of the draft tongue 21 of the rear mower is supported in the present adaptation on a caster wheel 22 having swiveled mounting in the front end of the tongue. The conventional sickle bar 23 projects outwardly from the front portion of the implement frame.

In the usual operating relation, the first mower 14 is off-set slightly relatively to the tractor to place the inner end of this sickle bar 23 on a fore and aft line outside of, but in proximity to, the adjacent tractor wheel 7. The rear mower 15 is offset or staggered from the front mower to dispose the inner end of the rear sickle bar 23 approximately in fore and aft alignment with the outer end of the sickle bar of the front mower.

Referring now to the hitch connections by which this relation between the mowers is maintained, it will be seen that a diagonal bar 25 extends between the two implements. Such bar constitutes the draft link through which draft pull is transmitted from the front mower to the rear mower. The front end of the bar 25 is mounted on a vertical pivot axis 26 supported on an elevated bracket carried by the frame of the front implement. Such bracket comprises a bar 27 which is bolted to the draft tongue 21 and extends upwardly and outwardly to the elevated point illustrated in Fig. 2. A brace link or rod 28 extends from the upper end of the bar 27 forwardly and downwardly to the front portion of the draft tongue for sustaining the draft pull transmitted to the pivot 26. The attachment of the bar 27 and brace rod 28 to the tongue 21 can, in most instances, be made directly to bolts 27' and 28' which are part of the standard construction of the implement, thereby avoiding the necessity of special drilling and attaching operations.

As will be noted from Fig. 2, the bracket structure 27, 28 disposes the draft bar 25 in a plane above the adjacent front mower wheel 19 so that said bar always clears this mower wheel in swinging laterally around its front pivot 26, thereby avoiding any interference or cramping of said draft bar even on sharp turns.

The rear end of said draft bar is also pivoted for horizontal swinging movement relatively to a vertical pivot 31 carried by the rear mower 15. This draft pivot is also supported on an elevated bracket comprising an upwardly extending diagonal bar 32 and a bracing strut or rod 33. The lower end of the bar 32 is secured to the longitudinally extending frame portion 17' by bolts 32', and the strut or rod 33 is secured to the draft tongue 21 by a bolt 33', which may be a part of the standard construction similarly to the bolt 27'. It will be seen from the foregoing that draft will be transmitted through the bar 25 from the front draft pivot 26 located adjacent to the front righthand corner of the forward implement frame back to the other draft pivot 31 supported on the rear implement frame at a point in rear of the front end of the draft tongue 21.

Positive steering is transmitted from the front to the rear implement in either direction of turn through a transverse bar 35 functioning as a steering link. Pivotal connection is established between the front implement 14 and said steering bar through a steering pivot 36 mounted on the rear end of an outrigger bar 37.

The latter has its front end secured to the frame portion 17' by a bolt 38 and projects outwardly and rearwardly from the frame. Said bar is supported and braced by two diagonal brace rods 38 and 39 extending between the frame and the bar.

The opposite end of the steering connection 35 has a pivotal mounting 41 on the front portion of the draft tongue 21 of the rear implement 15. Such pivotal connection is shown as consisting of an eye bolt secured to the tongue, with a downwardly turned hook portion on the bar 35 engaging in said eye bolt. To accommodate mowers having different lengths of sickle bars, and to accommodate other operating conditions, the steering link 35 is made adjustable in length. Referring to Fig. 3, one end of said bar comprises an inner section 35' having a telescopic sliding fit within the outer section 35. A pin 43 extends down through holes in the outer bar section 35 and is receivable selectively in different spaced holes 44 in the inner bar section 35', whereby the two sections can be rigidly secured together in any adjusted length of the steering connection.

When the implements are traveling straight ahead, the bar 35 functions as a rigid steering link acting in compression and in tension for accurately guiding the rear implement 15. That is to say, any tendency of this implement to veer to the left is resisted by the draft link 35 acting in compression and serving to thrust the draft tongue 21 in the opposite direction for retaining the implement in its straight line of travel.

Conversely, any tendency of the implement to veer to the right is resisted by the link 35 acting in tension and pulling or holding the draft tongue to the left, thereby maintaining the implement in a straight course of travel. A turn to the right at the corner of the crop results in the outer steering pivot 36 being swung outwardly to the left, since this pivot is in rear of the wheels 19 of the front mower. Such outward swinging of the pivot 36 first pulls outwardy on the draft link 35 and inner steering pivot 41, thereby operating in the initial part of the turn to deflect the draft tongue of the rear implement slightly to the left for causing the rear mower to follow in behind the sickle bar of the front mower. During this initial part of the turn the steering link 35 is acting under tension in slightly deflecting the draft tongue of the rear implement to the left. Thereafter during the remaining greater portion of the turn, the draft tongue of the rear implement is forced to the right to steer the rear implement to the right, in behind the front implement. During this remaining portion of the turn the steering link 35 is acting under compression to deflect the rear draft tongue to the right. It will thus be seen that the steering link 35 in first slightly deflecting the rear implement to the left in the initial part of the turn and in thereafter deflecting the rear implement to the right during the remaining greater portion of the turn, causes the rear implement to follow the front implement on approximately the same angle or arc of the turn and prevents the rear implement from cutting across the corner and thereby opening a gap between the outer end of the front sickle bar and the inner end of the rear sickle bar which would miss some of the crop.

In making a turn to the left this same operation occurs in reverse order, i. e. in the initial part of the turn, the steering pivot 36 will be swung inwardly, thereby transmitting a thrust through the link 35 acting under compression and causing the rear implement to be deflected outwardly slightly to the right, and thereafter during the remaining greater portion of the turn the steering link acts under tension to deflect the rear implement to the left. This causes the sickle bar of the rear implement to follow on the outer side of the angle or arc of swing of the front sickle bar whereby the full span of cut is maintained. In such turning, the same fore and aft alignment is retained between the outer end of the front sickle bar and the inner end of the rear bar, whereby no gap is opened up between said bars which would miss some of the crop.

Briefly summarized, the steering link 35 is capable of acting under compression and under tension, the same acting principally under compression in a turn to the right for pushing the draft tongue of the rear implement around to the right, and acting principally under tension in a turn to the left for pulling the draft tongue of the rear implement around to the left.

By locating the front draft pivot 26 forwardly of the wheels 19 of the front mower, substantially at the point shown, the two implements can be operated much closer together in a fore and aft direction. The crossed relation between the two bars 25 and 35, as shown in Fig. 1, is an important factor in obtaining the accurate steering guidance of the rear implement. The detachment of the hitch connections can be readily effected when the implements are to be operated singly.

Having thus described my invention, what I claim is:—

1. The combination with two implements adapted to be drawn in tandem offset relation to each other behind a pulling vehicle, of a hitch connection between the implements comprising a draft member connected with both implements, and steering means independent of said draft member and movable relatively thereto and acting to positively steer the rear implement in either direction of turn.

2. The combination with two implements connected by draft means and adapted to be drawn in tandem offset relation to each other behind a pulling vehicle, and steering means pivotally connected with each of said implements acting to maintain the offset relation between said implements and to positively steer the rear implement in either direction of turn.

3. The combination with two implements adapted to be drawn in tandem offset relation to each other behind a pulling vehicle, of a hitch connection between the implements comprising a draft member connected with both implements, and independent steering means having no connection with said draft member acting in compression and in tension for steering the rear implement in either direction of turn.

4. The combination with two implements adapted to be drawn in tandem offset relation to each other behind a pulling vehicle, of a hitch connection between the implements comprising a draft member connected with both implements, and a steering rod spaced apart from said draft member extending between said implements and connected to maintain the offset relation between said implements and to positively steer the rear implement in either direction of turn.

5. The combination with two implements adapted to be drawn in tandem offset relation to each other behind a pulling vehicle, of a hitch connection between the implements comprising a draft bar extending between the implements and pivotally connected with one, at one hitch point, and a steering bar extending between the implements and pivotally connected with one at a hitch point independent of said first named hitch point, said steering bar acting to maintain the offset relation between the implements and to positively steer the rear implement in either direction of turn.

6. The combination with two implements adapted to be drawn in tandem offset relation to each other behind a pulling vehicle, of a hitch connection between the implements comprising a draft bar pivotally connected directly to both implements, and a steering bar pivotally connected directly to both implements and acting in compression and in tension for steering the rear implement in either direction of turn.

7. The combination with two implements adapted to be drawn in tandem offset relation to each other behind a pulling vehicle, of a hitch connection between the implements comprising a draft bar pivotally connected with both implements, and a steering bar extending substantially transversely to the normal line of draft pivotally connected with the rear portion of the front implement and with the front portion of the rear implement.

8. The combination with two implements adapted to be drawn in tandem offset relation to each other behind a pulling vehicle, of a hitch connection between the implements comprising a draft bar extending diagonally between the implements and pivotally connected with both, and a steering bar extending substantially transversely to the path of travel of the implements and pivotally connected with the rear portion of the front implement and with the front portion of the rear implement.

9. The combination with two wheeled implements adapted to be drawn in tandem offset relation to each other behind a pulling vehicle, of a hitch connection between the implements comprising a draft bar, means pivotally connecting said bar with the front implement at a pivot point forward of the wheel axis of said implement, means connecting the rear portion of said bar with the rear implement, and steering means extending between the implements acting to positively steer the rear implement in either direction of turn.

10. The combination with two wheeled implements adapted to be drawn in tandem offset relation to each other behind a pulling vehicle, of a hitch connection between the implements comprising a draft bar, means pivotally connecting the front end of said bar with the front implement, said bar being arranged to clear the near wheel of said implement in turning, means pivotally connecting the rear portion of said draft bar with the rear implement, and a steering bar connected between the rear portion of said front implement and the front portion of said rear implement.

11. The combination with two wheeled implements adapted to be drawn in tandem offset relation to each other behind a pulling vehicle, of a hitch connection between the implements comprising a draft bar, bracket means pivotally connecting the front portion of said bar with the front implement at a pivot point disposed forwardly of the wheels of said implement and above the same whereby said draft bar can clear the adjacent wheel of the front implement in turning, means pivotally connecting the rear portions of said draft bar with the rear implement, and a steering bar extending substantially transversely between the implements and pivotally connected with both.

12. The combination with two mowers having forwardly extending draft tongues and adapted to be drawn in tandem offset relation to each other behind a tractor, of a hitch connection between the mowers comprising a draft member extending diagonally between the mowers, means pivotally connecting the front and rear ends of said draft member with both mowers, a bar projecting rearwardly from the front mower, and a rigid steering link extending between said bar and the draft tongue of the rear mower.

13. The combination with two mowers each having supporting wheels and a draft tongue and adapted to be drawn in tandem offset relation to each other behind a tractor, of a hitch connection between said implements comprising a diagonally extending draft bar, bracket means pivotally supporting the front end of said bar at a pivot point on the front mower disposed forwardly of the supporting wheels thereof, said bracket means supporting the front of said draft bar above the adjacent wheel of said front mower to clear the same in turning, bracket means establishing a rear draft pivot between the other end of said draft bar and the rear mower, a supporting bar projecting rearwardly from the front mower, and a steering rod pivotally connected between said supporting bar and the draft tongue of the rear mower and acting in compression and in tension for transmitting steering guidance to the latter implement.

14. The combination with two implements adapted to be drawn in tandem offset relation to each other behind a pulling vehicle, of a hitch connection between the implements comprising a draft member connected with both implements, and a steering connection comprising a steering rod movable relatively to said draft member acting in compression and in tension for steering the rear implement in either direction of turn, said steering connection being adjustable.

15. The combination with two implements adapted to be drawn in tandem offset relation to each other behind a tractor, of a hitch connection between the implements comprising a draft bar extending diagonally of the line of draft pivotally connected with both implements, and a steering bar extending transversely to the normal line of draft pivotally connected with both implements and acting to positively steer the rear implement in either direction of turn, and means for adjusting the effective length of said steering bar.

16. The combination with two mowers having forwardly extending draft tongues and adapted to be drawn in tandem offset relation to each other behind a tractor, of a hitch connection between said mowers comprising a diagonal draft bar pivotally connected at opposite ends with both mowers, an outrigger bar extending rearwardly and outwardly from the front mower in a direction generally away from the sickle bar of said mower, a steering bar having one end pivotally connected with said outrigger bar, means pivotally connecting the other end of said steering bar with the draft tongue of the rear mower, said steering bar comprising two telescopic sections adjustable for varying the effective length of said bar, and a caster wheel supporting the draft tongue of the rear mower.

17. The combination with two implements adapted to be drawn in tandem offset relation to each other behind a pulling vehicle, of a hitch connection between the implements comprising two separately movable bars operatively connected at their opposite ends with both implements and crossing each other intermediate said implements, said bars transmitting draft and steering guidance from the front implement to the rear implement with the latter disposed in offset relation to the front implement.

18. The combination with two elements adapted to be drawn in tandem offset relation to each other behind a pulling vehicle, draft means connecting said implements, steering means connecting said implements, one of said means being arranged above the wheels of one of said implements, said draft means and said steering means functioning entirely independently of each other and of their respective connections with said implements for transmitting draft and steering guidance to the trailing implement.

In witness whereof, I hereunto subscribe my name this 6th day of March, 1929.

OSCAR F. CARLSON.

CERTIFICATE OF CORRECTION.

Patent No. 1,835,592.                                           Granted December 8, 1931, to

OSCAR F. CARLSON.

It is hereby certified that error appears in the printed specification of the above numbered patent requiring correction as follows: Page 4, line 100, claim 15, after the word "extending" insert the word substantially; and that the said Letters Patent should be read with this correction therein that the same may conform to the record of the case in the Patent Office.

Signed and sealed this 16th day of February, A. D. 1932.

(Seal)                                                       M. J. Moore,
Acting Commissioner of Patents.